United States Patent [19]
Potier et al.

[11] Patent Number: 5,638,894
[45] Date of Patent: Jun. 17, 1997

[54] ELECTRICAL SUPPLY ARRANGEMENT FOR A MOTORIZED FAN UNIT FIXED ON A HEATEXCHANGER

[75] Inventors: Michel Potier, Rambouillet; Eduardo Santander, Vitry-sur-Seine, both of France

[73] Assignee: Valeo Thermique Moteur, Le Mesnil-Saint-Denis, France

[21] Appl. No.: 592,986

[22] Filed: Jan. 29, 1996

[30] Foreign Application Priority Data

Jan. 30, 1995 [FR] France ................... 95 01043

[51] Int. Cl.[6] ............................................. F01P 5/02
[52] U.S. Cl. .................. 165/121; 165/41; 165/DIG. 304; 123/41.49
[58] Field of Search ........................ 165/41, 121, 122, 165/DIG. 304, DIG. 305, DIG. 306; 123/41.49

[56] References Cited

U.S. PATENT DOCUMENTS 3,774,680  11/1973  Andreoli .
4,501,991  2/1985  Kawahira ................ 165/41
4,846,325  7/1989  Mohan .

FOREIGN PATENT DOCUMENTS 0183596  11/1985  European Pat. Off. .
0316137  5/1989  European Pat. Off. .
2118606  7/1972  France .
57-198311  12/1982  Japan .................. 123/41.49

*Primary Examiner*—Allen J. Flanigan
*Attorney, Agent, or Firm*—Morgan & Finnegan, L.L.P.

[57] ABSTRACT

The electrical supply cable for the motorized fan unit of a fan assisted heat exchanger, for example the cooling radiator for a motor vehicle internal combustion engine in which the radiator comprises a matrix consisting of tubes with cooling fins, extends through the matrix via a bore through the latter in which the cable is guided by an insulating member disposed within the matrix. The cable therefore does not pass along the face of the matrix on which the motorized fan unit is attached, so that damage to the cable is avoided.

The cable may be replaced by conductive elements which are encapsulated in the insulating member itself, these conductive elements cooperating with contacts of the motorized fan unit and of an external connector.

10 Claims, 2 Drawing Sheets

5,638,894

ELECTRICAL SUPPLY ARRANGEMENT FOR A MOTORIZED FAN UNIT FIXED ON A HEATEXCHANGER

FIELD OF THE INVENTION

This invention relates to an assembly comprising a heat exchanger in combination with a motorised fan unit, in which the heat exchanger comprises a rigid matrix defining first and second major faces of the matrix, the latter consisting of at least one row of tubes parallel to each other, together with cooling fins through which the tubes extend and to which the tubes are fixed, with the motorised fan unit being fixed on the heat exchanger in facing relationship with, and against, the said first major face of the matrix, so as to produce an air stream in thermal contact with the matrix, the motorised fan unit comprising an electric drive motor for driving a rotatable member of the fan unit, typically its fan rotor.

BACKGROUND OF THE INVENTION

Assemblies of the above kind are known in particular in the form of fan assisted radiators for the cooling of internal combustion engines of motor vehicles. The electric motor is usually supplied with power through a cable which extends along the first major face of the matrix, between the latter and the motorised fan unit. The latter is preferably located very close to the matrix, so as to reduce the overall size of the assembly and to avoid leakage of some of the forced air stream between the fan unit itself and the matrix. In such an arrangement, there is a danger of the cable becoming damaged by the rotating part of the fan unit, or by the exposed edges of the adjacent cooling fins of the matrix.

DISCUSSION OF THE INVENTION

An object of the invention is to overcome the above mentioned drawback, by proposing a new electrical supply arrangement through which the power supply for the electric motor can more safely be brought to the latter.

According to the invention, an assembly comprising: a heat exchanger having a rigid matrix which defines first and second major faces, and which comprises at least one row of tubes parallel to each other, together with cooling fins; and a motorised fan unit fixed on the heat exchanger in facing relationship with the said first major face of the matrix, for producing an air stream in thermal contact with the latter, the motorised fan unit including an electric motor for driving a component such as a fan rotor, is characterised in that the said assembly further includes traverse means for enabling an electric supply current for the said electric motor to be brought through the said matrix from one of the said major faces of the latter to the other.

The electric motor preferably has a base plate facing towards the said first major face of the matrix, with the said air stream being taken past the base plate in a direction generally transverse to the latter and in an annular configuration, the said traverse means being disposed in the region of the matrix within the perimeter of the base plate.

According to a preferred feature of the invention, the traverse means include electrical conductive elements accommodated at least partly in at least one insulating member which is disposed within the matrix of the heat exchanger, and which extends substantially from one of the said major faces of the matrix to the other.

In some embodiments, the said insulating member is an intermediate member interposed between two sections of cooling fins of the matrix, with at least part of the tubes extending through, and being attached to, the intermediate member, which also serves for fastening of the base plate, and therefore of the motorised fan unit itself, on the heat exchanger.

The said insulating member may be mounted in an aperture of the matrix, this aperture being located between two adjacent tubes of each row of tubes and being formed by voids formed in a plurality of adjacent cooling fins and extending over the whole thickness of the matrix.

In another embodiment, the said insulating member is formed as a projection of the base plate of the motorised fan unit.

In another embodiment, the said conductive elements comprise at least two conductive elements spaced radially apart from each other and extending through the insulating member, for making electrical contact with further conductive elements which are introduced through one or both of the said major faces of the matrix.

The conductive elements may be in the form of a flexible cable extending through a bore formed in the insulating member. The conductive elements may be at least partially encapsulated in the insulating member, in particular by being moulded into the latter.

According to another preferred feature of the invention, the assembly further includes a connecting and/or control unit, which is a separate component arranged to be fitted removably on the second major face of the matrix and having electrical terminals which make contact with the conductive elements of the traverse means when the connecting and/or control unit is so fitted, with, if appropriate, mechanical means being provided for fastening the said unit on the insulating member.

The said control unit may carry at least one temperature sensor which makes thermal contact with a tube of the matrix and which forms part of a circuit for controlling the power supply to the motorised fan unit.

The various features and advantages of the invention will be explained in greater detail in the following description, given by way of example only and with reference to the accompanying drawings, in which those elements that are identical or similar to each other are given the same reference numerals in all of the Figures of the drawings.

DESCRIPTION OF PREFERRED EMBODIMENTS OF THE INVENTION

Figure 1:
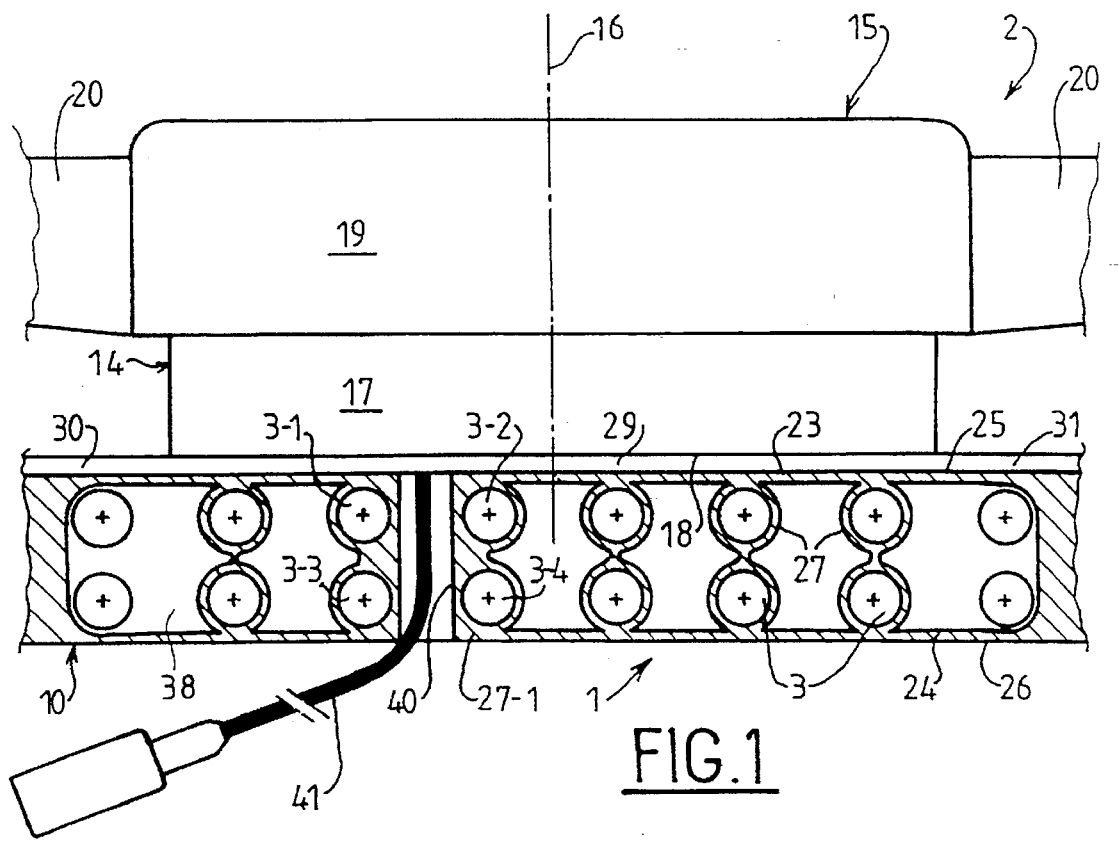
FIG. 1 is a view, partly seen in cross section through a plane perpendicular to the longitudinal direction of the tubes, of part of an assembly in one preferred embodiment of the invention.

The assembly shown in FIG. 1 comprises a radiator 1 for cooling the heat engine of a motor vehicle, together with a motorised fan unit 2 for producing a forced stream of air and for directing this air stream through the radiator. The radiator 1 comprises a set of parallel tubes 3, which in this example are arranged in two juxtaposed rows. The two ends of each tube are open into two respective headers (not shown), which are disposed in front of the plane of the Figure and behind that plane, respectively. In the usual way, the tubes 3 extend through rectangular metal cooling fins which lie in planes at right angles to the longitudinal direction of the tubes. The tubes are held in holes formed through the cooling fins, so as to make good thermal contact between the tubes and the cooling fins. The tubes and the fins thus together constitute a rigid matrix, having the general form of a parallelepiped and interposed between the two fluid headers of the assembly.

The cooling fins of the radiator matrix are divided into two sections, which are again situated in front of the plane of FIG. 1 and behind it, respectively, and which are separated by an intermediate member 10, made of moulded plastics material and disposed preferably halfway along the length of the matrix. The intermediate member 10 has, in a plane at right angles to the longitudinal direction of the tubes, a rectangular profile which is similar to that of the cooling fins. This profile does not project with respect to that of the cooling fins, and this enables the intermediate member to be fitted in position with virtually no modification of the production line on which the matrix is constructed.

The motorised fan unit 2 comprises a fixed part consisting of an electric motor 14, together with a rotating part in the form of a fan rotor 15. The rotor 15 is arranged to rotate with respect to the fixed part and with respect to the radiator, about an axis of rotation 16 at right angles to the major faces 25 and 26 of the parallelepiped defining the radiator matrix. The axis of rotation 16 passes substantially through the centre of these major faces 25 and 26. The electric motor 14 has a body 17 which is substantially in the form of a cylinder of revolution closed on the side nearest to the matrix by a substantially circular base plate (indicated for example at 18 in FIG. 5). The fan rotor 15 has a hub 19 which caps the motor body 17, the hub 19 being open towards the matrix and closed on the opposite side. Radial fan blades 20 project from the hub 19, and the outer radial ends (not shown) of the blades 20 are joined together by a ring or shroud (not shown), in the form of a cylinder of revolution centred on the axis of rotation 16. This defines an annular passage for the air stream produced by the fan blades 20.

The intermediate member 10 has a profile in the form of a l in cross section, and comprises two thin, integral webs 23 and 24 which partly define the major faces 25 and 26 of the matrix, and which face respectively towards and away from the motorised fan unit 2. These webs 23 and 24 are joined together through a spine portion 38 of the member 10. In the example shown in FIG. 1, the tubes 3 in both rows of tubes that extend past the electric motor 14, i.e. the twelve tubes which are closest to the axis of rotation 16, are surrounded by sleeve portions 27 formed on the spine portion 38. Each sleeve portion 27 closely surrounds the associated tubes 3, in such a way that the intermediate member 10 is firmly held with respect to the tubes 3, so as to constitute a rigid unit with the tubes and the two sections, mentioned above, of the cooling fins.

The base plate 18 of the motorised fan unit is extended beyond the diameter of the body 17 of the electric motor by radial lugs 30 and 31, and has a projection 29, at least at the level of these radial lugs 30 and 31, the projection 29 being disposed facing towards the matrix. The fastening lugs 30 and 31 are attached on the web 23 by means of screws not shown, so as to secure the motor body 17, and therefore the whole of the motorised fan unit 2, on to the matrix of the radiator.

Most of the sleeve portions 27 of the intermediate member 10 are each associated with two of the tubes 3, one in each row of tubes. However, there are four tubes extending through one of these sleeve portions, indicated at 27-1 in FIG. 1. The four tubes in the sleeve portion 27-1 consist of two tubes 3-1 and 3-2 in the row nearest to the major face 25 of the matrix, and two tubes 3-3 and 3-4 in the other row, the tubes 3-3 and 3-4 being aligned with the tubes 3-1 and 3-2 respectively. A transverse bore 40 is formed in the sleeve portion 27-1 between the tubes 3-1 and 3-3 on the one hand and the tubes 3-2 and 3-4 on the other hand. This bore 40 is open through the major faces 25 and 26 of the matrix, and is oriented at right angles to the latter. An electric power supply cable 41, extending out of the base plate 18 through the projection 29, extends through the radiator matrix via its transverse bore 40. The sleeve portion 27-1, with its bore 40, constitutes a traverse means whereby the cable is taken safely to the motor, without any danger of damage by contact with the fan rotor or with exposed edges of the cooling fins.

Figure 2:
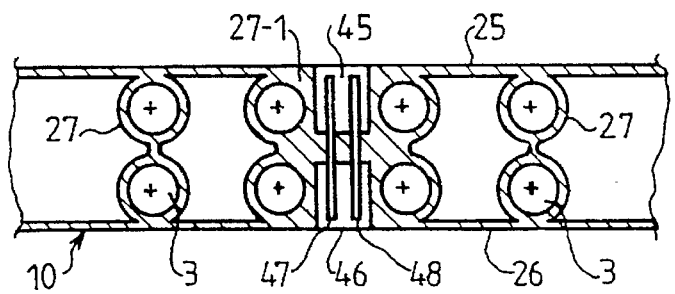
FIG. 2 is a scrap view in cross section similar to FIG. 1, but shows only the matrix and the traverse means, in another embodiment of the assembly in accordance with the invention.
Figure 3:
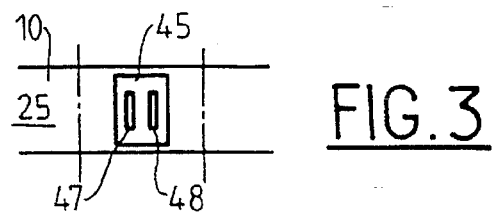
FIG. 3 is a front view of part of a heat exchanger in the embodiment of FIG. 2, showing the traverse means.

Reference is now made to FIGS. 2 and 3, which show an intermediate member 10 similar to that in FIG. 1, but in which the transverse bore 40 is replaced by two blind holes 45 and 46 which are arranged in alignment with each other, these blind holes being open in the major faces 25 and 26 respectively. Two metal contact tongues 47 and 48, extending substantially in planes at right angles to the faces 25 and 26 of the matrix, are arranged with their middle portions encapsulated in the sleeve portion 27-1 between the holes 45 and 46. The end regions of these tongues 47 and 48 lie in the holes 45 and 46 respectively. The end regions of these tongues 47 and 48, lying in the hole 45, are able to cooperate with, for example, respective female contact tags (not shown) fixed with respect to the body 17 of the motorised fan unit and projecting from the projection 29. Similarly, the end portions of the tongues 47 and 48 lying in the hole 46 constitute male contact tags which can cooperate with further, female, contact tags so as to connect the electric motor 14 electrically to a power supply circuit. The traverse means here comprise the portion 27-1 with its holes 45, 46 and the tongues 47, 48.

Figure 4:
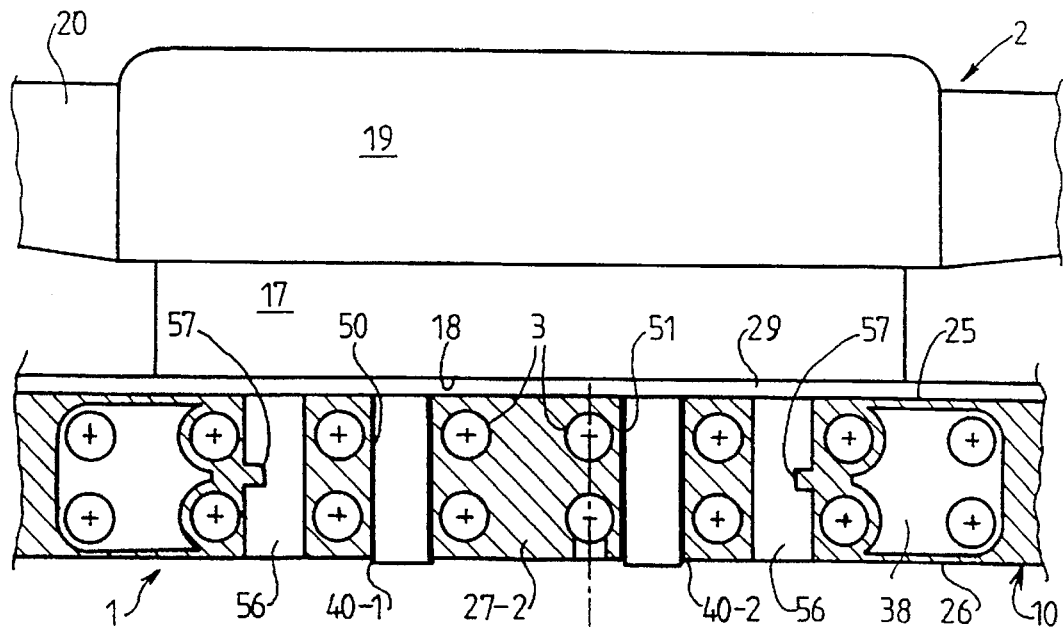
FIG. 4 is a view similar to FIG. 1 but showing a further embodiment of an assembly in accordance with the invention.

Reference is now made to FIG. 4, which shows a modified form of the intermediate member 10, in which one sleeve portion 27-2 has twelve tubes 3 passing through it, namely two tubes in each row. Two transverse bores 40-1 and 40-2, similar to the bore 40 in FIG. 1, are formed through the sleeve portion 27-2, and are flanked by respective groups of four tubes which constitute the eight middle tubes of the twelve tubes mentioned above. These bores 40-1 and 40-2 receive two respective electrical supply terminals 50 and 51 of the motor of the motorised fan unit 2. These terminals 50 and 51 are tubular, and project from the projection 29. The terminals 50 and 51 are able to receive, in turn, respective terminals 52 and 53 (in the form of male pins) of a connecting and control unit 54, so as to establish electrical contact when this unit 54 is fitted on the major face 26 of the matrix in a connecting position. It may be held in this position by means of two resilient lugs 55, which are part of the housing of the unit 54 and which penetrate into apertures 56 formed through the sleeve portion 27-2 on either side of the eight central tubes 3 mentioned above. The lugs 55 make hooking engagement on projecting elements 57 formed integrally with the sleeve portion 27-2. The unit 54 may of course be attached in any other suitable way, for example by means of a screw passing through it and screwed into the sleeve portion 27-2.

Figure 5:
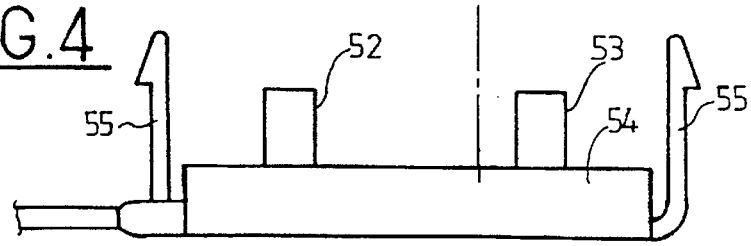
FIG. 5 is another view similar to FIG. 1, but shows yet another embodiment of an assembly in accordance with the invention.
Figure 5:
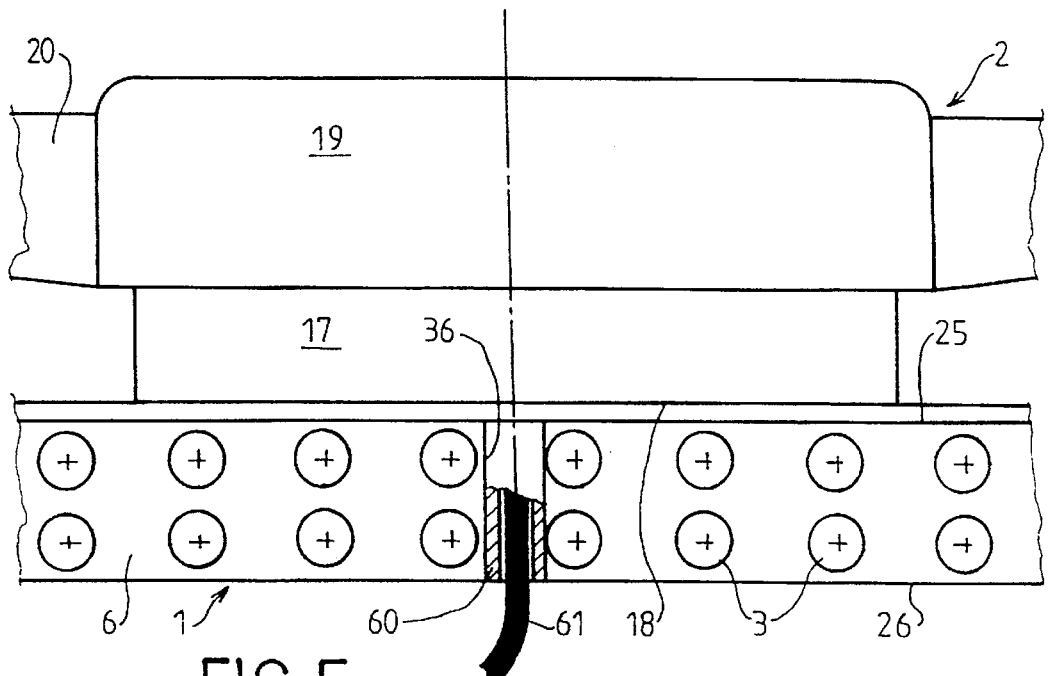

Reference is now made to FIG. 5, which shows part of an assembly in which the heat exchanger does not have the intermediate members of the other embodiments described above. In this case, the base plate 18 of the motorised fan unit may for example be fixed directly on to the cooling fins, indicated at 6, of the radiator matrix. A fraction of the length of some of these cooling fins is removed between two adjacent tubes of each row, so as to form an aperture extending through the matrix from its major face 25 to its major face 26. A tubular extension 60, projecting from the base plate 18, passes through this aperture. The extension 60 acts as a guide for the power supply cable 61 to the motorised fan unit whereby it passes through the matrix, and prevents this cable from becoming damaged by the edges of the cooling fins 6 in the aperture 36. The cooling fins may be cut without difficulty, for example in a press-forming operation, so as to form the aperture 36. The latter preferably has a square profile, the length of the sides of which corresponds to the diameter of the extension 60.

What is claimed is:

1. In combination, a heat exchanger and a motorised fan unit carried on the heat exchanger, in which the heat exchanger comprises a rigid matrix defining first and second major faces and consisting of a plurality of cooling fins and a plurality of tubes, the tubes being parallel to each other and arranged in at least one row extending through the cooling fins, the motorised fan unit being disposed in facing relationship with the said first major face of the matrix, for producing an air stream in thermal contact with the matrix, the motorised fan unit comprising an electric drive motor, wherein the said combination further includes traverse means for an electric power supply for the motor, the said traverse means extending through the matrix from one said major face of the latter to the other.

2. The combination of claim 1, wherein the motor has a base plate facing towards the said first major face of the matrix, the motorised fan unit defining an annular cross sectional configuration of said air stream around the base plate, the said traverse means being disposed in a region of the matrix covered by the said base plate.

3. The combination of claim 1, further including an electrically insulating member disposed within the matrix and extending substantially from one of the said major faces of the latter to the other, the said traverse means including electrical conductors mounted at least partly in at least one said insulating member.

4. The combination of claim 2, further including an electrically insulating member disposed within the matrix and extending substantially from one of the said major faces of the latter to the other, the said traverse means including electrical conductors accommodated at least partly in at least one said insulating member, said cooling fins of the said matrix being divided into two sections, the said insulating member being an intermediate member interposed between the two said cooling fin sections, with at least a portion of the tubes extending through the said intermediate member and being fixed to the latter, the said combination further including means fastening the said base plate to the intermediate member, whereby to secure the motorised fan unit on the heat exchanger.

5. The combination of claim 3, wherein a plurality of adjacent cooling fins define voids formed through them over the whole thickness of the matrix, whereby the said voids define an aperture through the matrix between two adjacent tubes of each said row, the said insulating member being mounted in the said aperture.

6. The combination of claim 5, wherein the said insulating member is an extension of the base plate of the motorised fan unit.

7. The combination of claim 3, wherein the said electrical conductors comprise at least two first conductive elements spaced radially apart from each other and extending transversely through the said insulating member, together with second conductive elements introduced through at least one of the said major faces of the matrix for making electrical contact with the said first conductive elements.

8. The combination of claim 3, wherein the insulating member defines a bore through it, the said combination including a flexible cable extending through the said bore and containing the said electrical conductors.

9. The combination of claim 3, wherein the said electrical conductors are at least partially encapsulated in the insulating member.

10. The combination of claim 3, further including a separate connecting/control unit and means for attaching the said unit removably on the said second major face of the matrix, the said unit having electrical terminals and the said traverse means having electrical connection means making electrical contact with the said terminals when the unit is attached to the matrix.

* * * * *